US007251125B2

(12) United States Patent
Heckerman (10) Patent No.: US 7,251,125 B2
(45) Date of Patent: Jul. 31, 2007

(54) FLAT SCREEN DISPLAY STAND

(76) Inventor: Donald A. Heckerman, 1567 Harmony Rd., Akron, OH (US) 44333

( * ) Notice: Subject to any disclaimer, the term of this patent is extended or adjusted under 35 U.S.C. 154(b) by 78 days.

(21) Appl. No.: 10/906,909

(22) Filed: Mar. 11, 2005

(65) Prior Publication Data

US 2005/0207100 A1   Sep. 22, 2005

Related U.S. Application Data

(60) Provisional application No. 60/554,033, filed on Mar. 17, 2004.

(51) Int. Cl.
*G06F 1/16* (2006.01)
(52) U.S. Cl. .......................... 361/681; 361/683
(58) Field of Classification Search ................ 361/681
See application file for complete search history.

(56) References Cited

U.S. PATENT DOCUMENTS

| | | | | |
|---|---|---|---|---|
| 2,723,817 A | * | 11/1955 | Harwood et al. | |
| 4,467,727 A | * | 8/1984 | Strommer | 108/23 |
| 4,470,571 A | * | 9/1984 | Hartman | 248/452 |
| 4,726,556 A | * | 2/1988 | Weir | 248/454 |
| 5,624,096 A | * | 4/1997 | Haynes | 248/451 |
| 5,722,628 A | | 3/1998 | Menaged | |
| 5,793,606 A | | 8/1998 | Cubbage et al. | |
| 5,854,735 A | | 12/1998 | Cheng | |
| 5,855,351 A | * | 1/1999 | Cziraky et al. | 248/451 |
| 5,887,837 A | | 3/1999 | Johns et al. | |
| 5,978,211 A | | 11/1999 | Hong | |
| 6,010,111 A | | 1/2000 | Cho | |
| 6,024,335 A | | 2/2000 | Min | |
| 6,050,849 A | | 4/2000 | Chang | |
| 6,105,919 A | | 8/2000 | Min | |

(Continued)

FOREIGN PATENT DOCUMENTS

GB   2 380 884 A   4/2003

(Continued)

OTHER PUBLICATIONS

ATDEC, Various Pole Mounts, Printouts from Atdec Website (http://www.atdec.com), 2 pages, (Mar. 8, 2004).

(Continued)

*Primary Examiner*—Lisa Lea-Edmonds
*Assistant Examiner*—Anthony Q. Edwards
(74) *Attorney, Agent, or Firm*—Hahn Loeser & Parks, LLP; Keith J. Marcinowski (57) ABSTRACT

The present invention relates to a stand 1 for an external flat screen display device 4a such as an LCD or plasma display monitor. Accordingly, the stand 1 has base side members 2 that create clearance 6a where an attached portable computer display can be stored behind a mounted, external flat screen display 4a. The attached portable computer display 10 is slid between the base side members while being tucked under and behind the mounted flat screen display 4a. The mounted flat screen display 4a remains positioned directly above the portable computer's 9 keyboard, while the portable computer 9 remains positioned between the base side members. The present invention also provides a flat screen display stand 1 that does not significantly increase the dimensions of the shipping container. Alternatively, this invention may be used to mount flat screen display 4a devices to both horizontal and vertical surfaces.

19 Claims, 7 Drawing Sheets

U.S. PATENT DOCUMENTS

| | | | |
|---|---|---|---|
| 6,208,505 B1 * | 3/2001 | Kuchta et al. | 361/683 |
| 6,268,998 B1 | 7/2001 | Cho | |
| 6,352,233 B1 * | 3/2002 | Barberich | 248/676 |
| 6,354,552 B1 | 3/2002 | Chiu | |
| 6,437,975 B1 | 8/2002 | Huang | |
| 6,502,792 B1 | 1/2003 | Cho et al. | |
| 6,575,419 B1 * | 6/2003 | Masuda et al. | 248/371 |
| 6,581,893 B1 | 6/2003 | Lu | |
| 6,637,104 B1 * | 10/2003 | Masuda et al. | |
| 6,651,943 B2 | 11/2003 | Cho et al. | |
| 6,807,050 B1 * | 10/2004 | Whitehorn et al. | |
| 6,819,548 B2 * | 11/2004 | Hillis et al. | |
| 6,874,744 B2 * | 4/2005 | Rawlings et al. | |
| 6,913,238 B2 | 7/2005 | Bakker et al. | |
| 6,940,714 B2 * | 9/2005 | Helot et al. | |
| 6,987,666 B2 * | 1/2006 | Medica et al. | |
| 2003/0067739 A1 * | 4/2003 | Kim et al. | |
| 2003/0075649 A1 | 4/2003 | Jeong et al. | |
| 2003/0111582 A1 * | 6/2003 | Bakker et al. | |
| 2003/0168558 A1 * | 9/2003 | Mallory et al. | |
| 2004/0155861 A1 * | 8/2004 | Jakson, III | |
| 2006/0023405 A1 * | 2/2006 | Lin et al. | |
| 2006/0108483 A1 * | 5/2006 | Wolff et al. | |

FOREIGN PATENT DOCUMENTS

WO     WO 01/7999 A1     2/2001

OTHER PUBLICATIONS

Chief Manufacturing, Various Small Flat Panel Display Mounts, Printout from Chief Manufacturing Website (http://www.chiefmfg.com), 9 pages, (Mar. 8, 2004).

ERGOTRON, Flat Panel Mounting Solutions, DeskStand 400, Printout from Ergotron Website (http://www.ergotron.com), 1 page, (Mar. 8, 2004).

Kensington, Flat Panel Monitor Stand, Printout from Kensington Website (http://uk.kensingtoneurope.com), 1 page, (Mar. 8, 2004).

PEERLESS, PLQ PD1 Quad Matrix Wall Mount for NEC Plasma Screen Models, Printout from Mounts and More Website (http://mountsandmore.com), 4 pages, (Mar. 8, 2004).

Plasmadepot.Com, Plasma Table Stands, Printout from PlasmaDepot.com Website (http://www.plasmadepot.com), 2 pages, (Mar. 8, 2004).

International Search Report mailed Mar. 6, 2007 in PCT/IB05/50886.

* cited by examiner

FLAT SCREEN DISPLAY STAND

PRIORITY

This application claims priority to U.S. provisional application Ser. No. 60/554,033, filed Mar. 17, 2004, the disclosure of which is hereby incorporated by reference.

FIELD OF THE INVENTION

The present invention relates generally to a flat screen display stand. In particular, it relates to an optional stand that allows a laptop computer keyboard to be positioned directly in front of an external flat screen display while the laptop computer's attached display is tucked behind the external, peripheral, flat screen display.

BACKGROUND OF THE INVENTION

Laptop computers are quickly replacing desktop computers in both the home and office environments. Due to advancements in computer engineering, these machines have become powerful enough to become suitable alternatives for desktop computers. These advancements have also allowed computer manufacturers to develop machines that are smaller and more compact. Likewise, the processing power of smaller computing devices such as personal digital assistants (PDAs), wireless handheld devices and cell phones have increased dramatically as well. Many of these small handheld computers may now be used with compact keyboards and attached to external display devices. While the processing capacity of portable computing devices seems virtually unlimited, the physical dimensions of the portable computing device's screens are limited. For example, the display must remain small enough for the portable computer to remain portable and energy efficient. Accordingly, frequent users of laptops, PDAs, and wireless devices in a non-mobile location such as a home or office will attach an ancillary, larger flat screen display to their computer to assist with viewing the images on the screen. Flat screen liquid crystal display (LCD) and plasma display monitors are becoming increasing more affordable. The compact size, lightweight and energy efficiency of these flat screen monitors are ideally suitable for use with portable computers. These benefits give mobile computer users the best of both worlds—the portability of a small computer display when traveling as well as the versatility of a large display when working at home or at the office.

Most peripheral flat screen displays utilize a center support post design. The center post prevents laptop computers from being used with external displays in a straight-line fashion with a laptop computer. This is because the attached laptop display cannot be folded open and tucked under and behind the external display. Therefore, the user has to position the laptop computer off to the side of the external display. This arrangement also requires the laptop's attached keyboard and pointing device to be placed at an offset angle from the display device, thus requiring the user to repeatedly look to the side to use the external display. Furthermore, the current center post design elevates the flat screen displays 3 to 4 inches above the work surface of the laptop keyboard. This may cause discomfort and neck strain to users who wear bifocal eyeglasses because such a user would be required to tilt back his or her neck to view the screen. For users with bifocal eyeglasses, it is often preferred for the bottom edge of the flat screen to be as close as possible to the surface of the computer keyboard. While the user could attach an external keyboard to the laptop for placement directly in front of the flat screen, this would require additional desk space, negating the "small footprint" benefit of flat screen displays. The present invention overcomes the limitations of previous flat screen display stands by providing a flat screen display stand that is both portable and practical for use with a laptop computer.

Prior art peripheral flat screen display stands also require larger shipping containers, thereby increasing storage and shipping costs for these devices. The devices' bulky cylindrical, cone, or pedestal shaped center support posts, prevent the units from being shipped in flat containers with substantially the same dimensions as the flat screen display device. These larger containers require additional storage and shipping space, thus increasing overall cost.

There is therefore a need for a portable, peripheral flat screen display stand that allows a laptop computer's keyboard to be placed directly in front of a connected peripheral flat screen display. The stand also allows the peripheral display to be positioned just above the laptop computer's keyboard at an optimal viewing angle and distance. A need also exists for a peripheral flat screen display stand that minimizes the "foot print" of the work station surface by allowing the laptop screen to be folded open relative to the laptop computer keyboard so that it can be tucked underneath and/or behind the suspended peripheral flat screen display, while enabling the user to utilize the laptop computers keyboard and mouse functions.

SUMMARY OF THE INVENTION

The present invention represents an advancement in the art of flat screen display stands in that it provides a portable peripheral flat screen display stand where the attached laptop display can be folded open, for example by up to 180 degrees or more, relative to the laptop keyboard and tucked below and/or behind the peripheral display, allowing the keyboard to be placed directly in front of the peripheral display device, obviating the limitations of the prior art stands.

In accordance with a preferred embodiment of the present invention, there is provided a flat screen display stand comprising a frame on which a flat screen display device is mounted. The flat screen-mounting frame is affixed to at least a pair of supporting base members. The flat screen-mounting frame's height and/or width may be adjustable in order to accommodate a variety of flat screen displays. The base members are spaced apart sufficiently to accommodate one or a variety of portable computer dimensions. An opening between both the base side members and the bottom of the flat screen-mounting frame or flat screen display and the horizontal resting surface is provided that is sufficient to allow a laptop or other small computer screen to be slipped under and tucked behind the peripheral display device mounted on the stand. Thus, the ancillary flat screen display is suspended above the rear edge of the laptop computer's keyboard. While the preferred embodiment illustrates base members that are triangular, the base members may also be any variety of shapes, as long as the configuration comprises a stable base upon which to the mount the display device. The preferred embodiment shows a mounting frame that is fixedly attached to the base members. In other embodiments the frame may be adjustably, removably, hingedly or otherwise attached to the base members. Still, this and other embodiments may allow the frame's horizontal, vertical and/or tilt positions to be adjusted relative to the user.

One preferred embodiment features a display stand with the flat screen display device mounted in place, while leaving an opening for a laptop computer between the bottom edge of the flat screen display or mounting frame and the horizontal surface upon which the stand rests. This opening creates a space whereby the attached laptop screen can be slipped under and tucked behind the peripheral flat screen display. This arrangement leaves the laptop keyboard sitting below and in front of the peripheral flat screen display.

Certain embodiments of the invention provide a peripheral flat screen display stand that can be shipped along with the flat screen display device without substantially increasing the dimensions or the weight of the shipping container beyond the dimensions and weight of the flat panel display device. In a preferred embodiment, the flat panel display stand is fabricated with lightweight but strong metals or plastics. The flat screen-mounting frame and members may be designed to break apart, collapse and/or fold flat, such that there is minimal increase in the weight or dimensions of the shipping container.

Other variations of the invention may include a flat screen display stand with an associated or built-in laptop docking station such that the laptop computer can be connected to the flat screen display device, Ethernet, power, and other peripheral devices. Other peripheral devices such as external speakers, microphone, video conferencing cameras, etc. may be attached to the flat screen display stand. Printers, scanners and other devices may also be attached to the rear of the stand, reducing the "footprint" of the computer workstation at the user's desk.

After Market Manufacturers (AMMs) as well as Original Equipment Manufacturers (OEMs) can utilize the embodiments mentioned above. These designs can encompass business, home, and commercial applications. The OEM versions would enable the display Manufacturers to ship the flat screen displays using the smallest possible "cube space" by eliminating the need for a flat screen-mounting frame. This could be accomplished by fabricating the mounting means for the base members directly into the flat screen display device. Therefore, the flat screen display could be shipped with thinner, flatter, base members, rather than with a bulky center post.

Still another embodiment allows the flat screen display stand to be fabricated to accommodate significantly larger devices such as plasma and LCD televisions and monitors. The flat screen display stand comprising parallel vertical members attached to a flat screen display mounting frame would allow larger plasma and LCD displays to be moveably positioned on the floor, desktop, or other flat surfaces. Still another embodiment allows the flat screen display-mounting frame to be used alternatively with a wall-mounting bracket and without the vertical members. This design would allow the flat screen display to be moveably positioned upon the wall.

DETAILED DESCRIPTION OF THE PREFERRED EMBODIMENT

Figure 11:
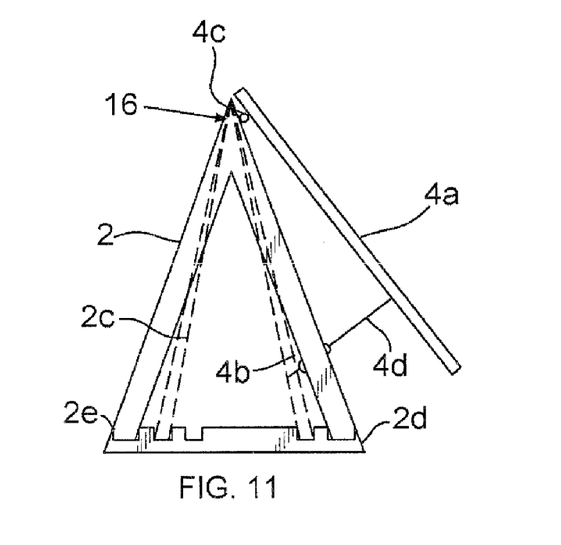
FIG. 11 is a side view of the stand with base side members hingedly attached to one another for tilt adjustment of the flat screen display.
Figure 12:
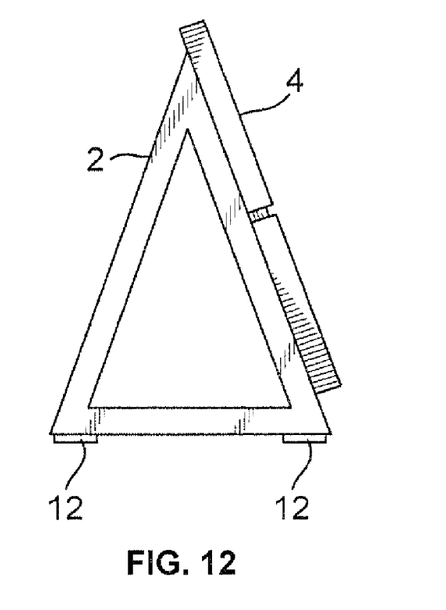
FIG. 12 is a side view of the stand with elevator adjustment legs attached to the base members used both to tilt the stand and to raise the height of the stand.
Figure 13:
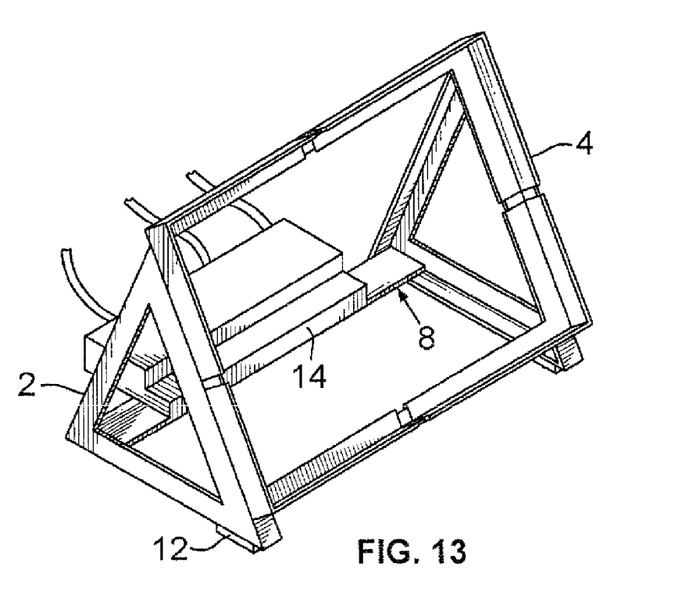
FIG. 13 is a side view of the stand with an attached laptop docking station.
Figure 14:
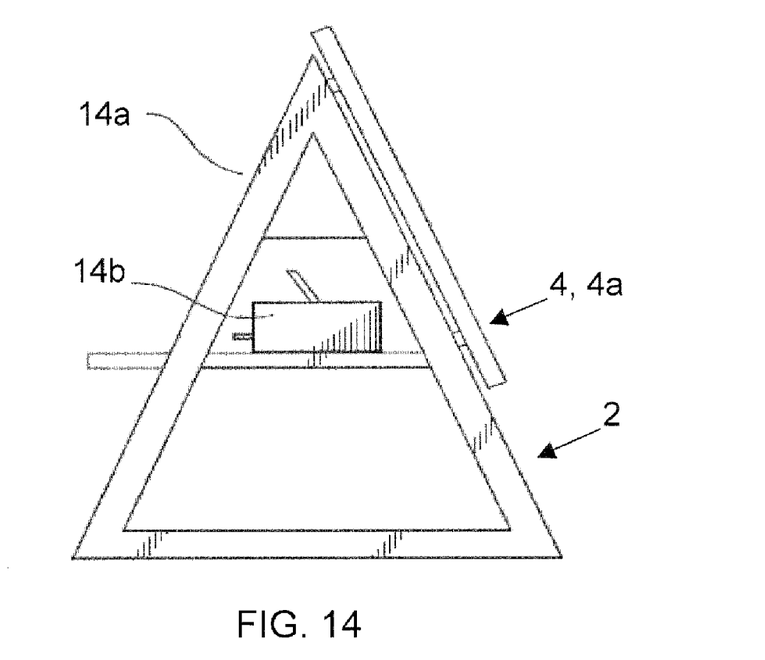
FIG. 14 is a perspective view of other peripheral devices attached to the flat screen display stand.

A portable flat screen display stand in accordance with a preferred embodiment of the present invention is indicated by way of general illustration in FIGS. 1–14, and by the reference numeral 1. The flat screen display stand is comprised of base members 2 and optional mounting frame 4. The base members 2 support the flat screen display device 4a by serving as the "legs" of the display stand. The flat screen display stand is also comprised of an optional flat screen-mounting frame 4 that holds a flat screen display 4a in place so that in can be supported by base members 2. The mounting frame 4 is attached to base members 2 along each of its vertical portions. The base members 2 are mounted on either side of the mounting frame and spaced apart to accommodate one or a variety of laptop computers of varying dimensions in the space between the width of the stand. If necessary, one or more support braces 15 (FIG. 10) may also be used between base members 2, attaching the base members to one another, so that larger and heavier displays can be supported. The flat screen-mounting frame's height and/or width may optionally be adjustable in order to accommodate flat screen displays of various dimensions as shown in FIGS. 12 and 13. When the stand is fully operational, an open space 6a is created between the bottom edge of the flat screen-mounting frame or flat screen display and the horizontal mounting surface and the space between the base side members. This space 6a is of sufficient height and the base side members are sufficiently spaced apart enough allow a laptop computer screen to be slipped under and tucked behind the peripheral flat screen display device 4a mounted on the stand (FIGS. 1–4 and 6). Accordingly, the base side members 2 also create clearance behind the flat screen display 4a where an attached portable computer display can be stored. This allows the ancillary flat screen display 4a to be suspended above the rear portion of a laptop computer's keyboard. However, while the functionality of the stand is illustrated using a laptop computer, it is understood that stand could be adapted to accommodate a variety of portable computing devices that attach to external displays, including personal digital assistants (PDAs), wireless handheld devices and/or computer-based cell phones.

There are several variations of the portable flat screen display stand, which fall within the scope of this invention. For example, in the version mentioned above (FIGS. 1–4 and 6), the base side members 2 are fixedly attached to either side of the flat screen-mounting frame 4 as shown in FIG. 1. The base side members are of sufficient size and appropriately shaped to support the heft of a flat screen display device mounted in the flat screen-mounting frame. The mounting frame is of sufficient size and appropriately shaped to hold a flat screen display device. The frame is also of sufficient width to allow the base side members to be sufficiently spaced apart far enough to accommodate one or a variety of laptop computer dimensions. The mounting frame 4 rests along the upper portions of the base members 2 such that an opening 6a is created to allow a laptop computer display to tuck behind the flat screen display. In this version the base members and mounting frame are fixedly attached.

Figure 5:
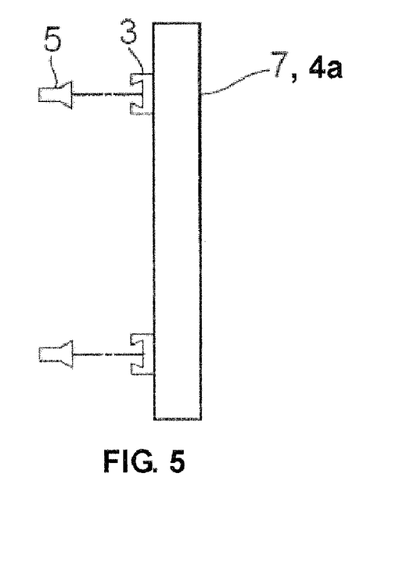
FIG. 5 is a side view of the mating male and female dovetail groove design used on a flat screen display for wall mounting.
Figure 6:
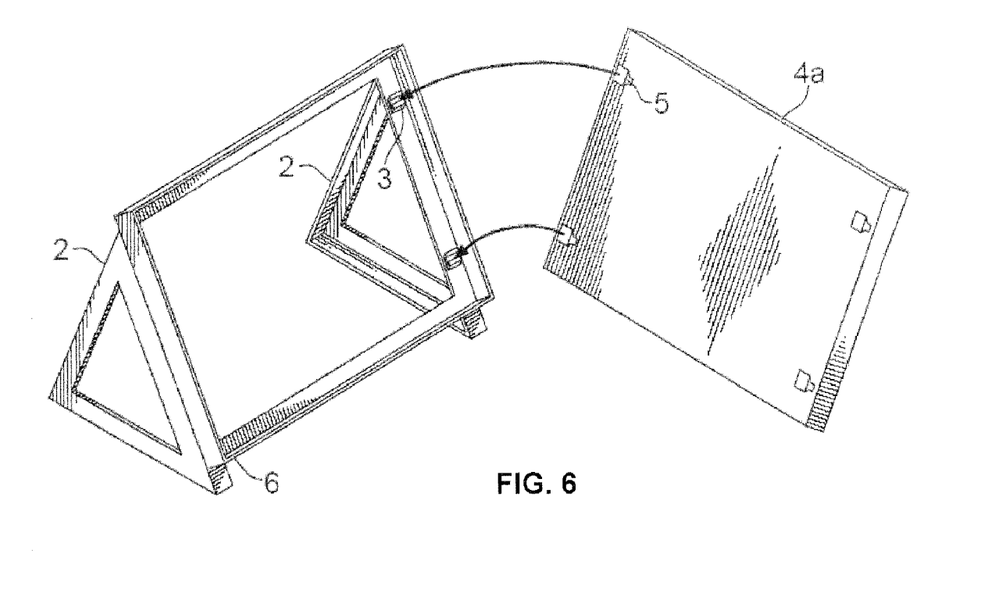
FIG. 6 is a perspective view of the base members with means for attaching a flat screen display or flat screen-mounting frame.
Figure 7:
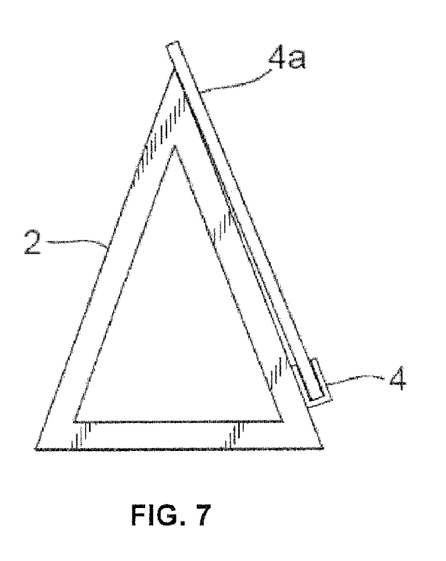
FIG. 7 is a side view of the easel frame design with its bottom trough assembly mounted on the base members.

The peripheral flat screen display 4a may be attached to the flat screen-mounting frame 4 or base side members using a variety of fastening and mounting means (FIGS. 1–7). For example, the flat screen 4a may be removably attached as shown in FIGS. 6 and 7. Removable and/or fixed attachment may be accomplished by manufacturing the flat screen-mounting frame 4 to be compliant with the Video Electronics Standards Association (VESA) Flat Display Mounting Interface Standards. Other methods of removable attachment may include a mating dovetail system, adhesive tapes, hook and loop fastener, clips, screws, etc. Alternatively, the flat screen could rest within the flat screen-mounting frame or base side members without an attachment means (e.g. FIGS. 2 and 7). Another embodiment (FIG. 6) uses a mating dovetail groove system 3, 5 on the flat screen display 4a for attachment to the display-mounting frame 4. These are only a few examples of the manner in which the flat screen display 4a may be attached to the mounting frame 4. It is understood that a variety of means for attachment or mounting could be used.

Figure 1:
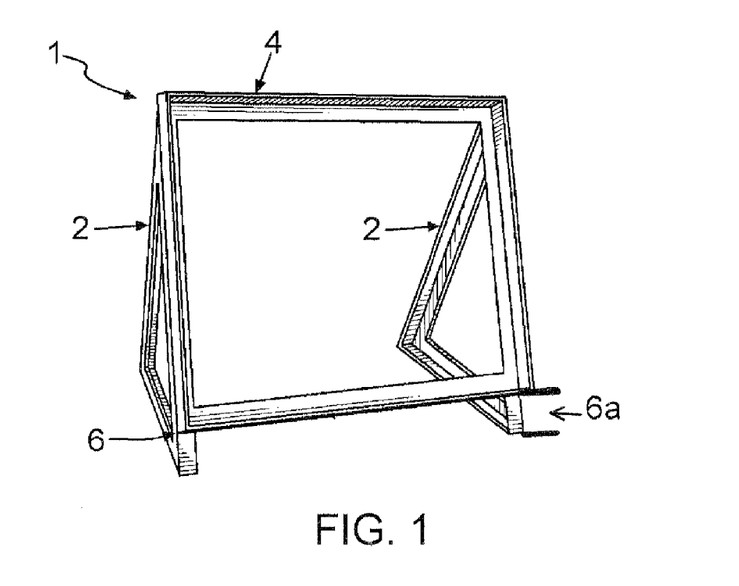
FIG. 1 is a perspective of view of the flat screen display stand.
Figure 2:
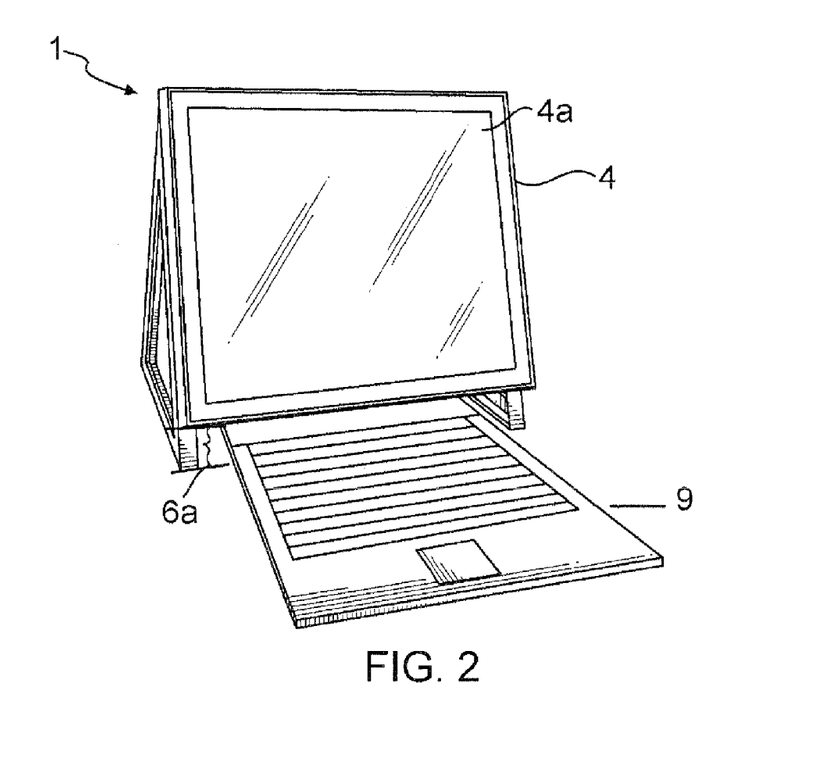
FIG. 2 is a perspective view of the flat screen display stand mounted above a laptop computer.
Figure 3:
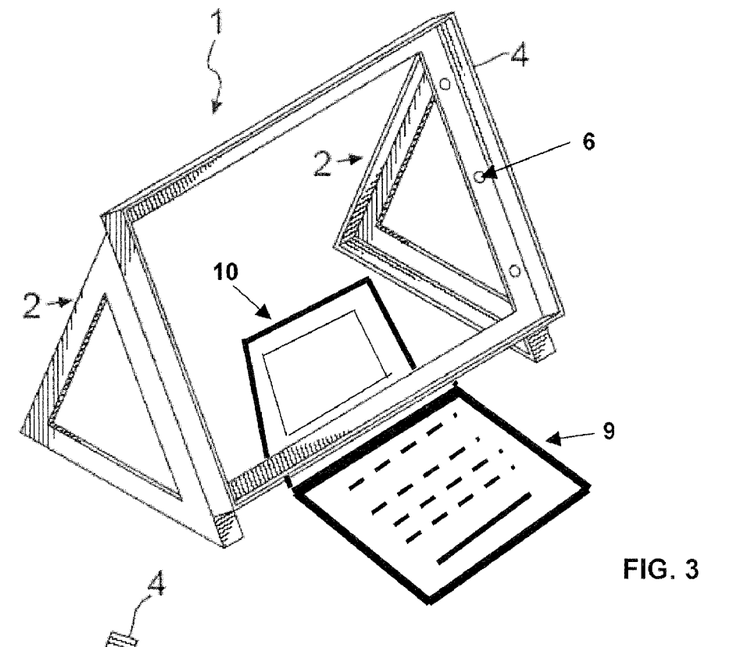
FIG. 3 is a perspective view of the flat screen display stand.
Figure 4:
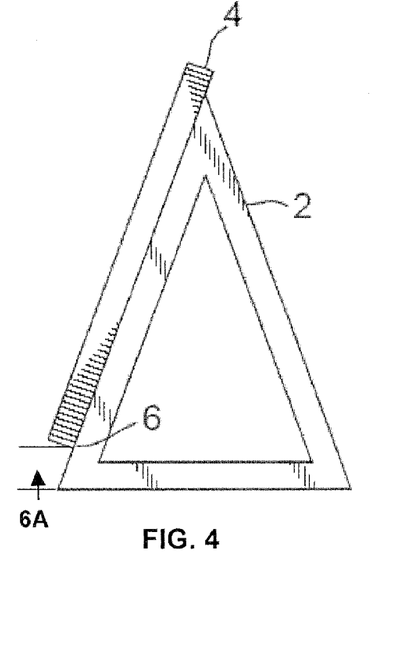
FIG. 4 is side view of the flat screen display stand.
Figure 8:
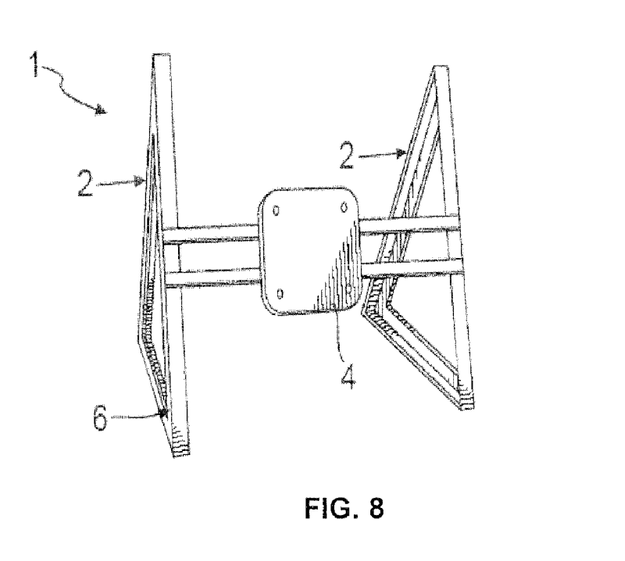
FIG. 8 is a perspective view of a flat screen display stand with a sheet of material for mounting the flat screen display to the base members.

As discussed above, the flat screen-mounting frame 4 may be a variety of shapes and sizes as shown in FIGS. 1 thru 14. In one embodiment, the flat screen-mounting frame 4 is substantially rectangular with an "L" shaped cross section, at least along its bottom edge, and an open center area (FIGS. 1, 3 and 6). The frame could also be square, having a cross section of "C", "U" or "V" or some other shape, or a variety of variations on that general embodiment. Alternatively, the flat screen-mounting frame 4 could also be a sheet of material of virtually any shape that supports the flat screen display 4a on base members 2. For example, FIG. 8 shows a flat sheet of material mounted on a horizontal rod between base side members 2. This configuration allows flat screen monitors 4a with only a central support area to be mounted on the base side members 2. Another variation of the flat screen-mounting frame 4 is a rail 4e with a "U" shaped (or some other shape) cross section that connects between vertical portions of the two, spaced apart, base members 2, creating an easel design as shown in FIG. 7. Here, the lower edge of the flat screen display 4a rests within the rail 4e, allowing the upper portion of the display 4a to lean against the upper portion of the base members 2. Any variation of this design that creates a portable, free-standing flat screen display stand by attaching an ancillary flat screen display 4a between base members 2, creating an opening 6a between the bottom edge of the display and the surface such that the portable computer screen 10 can be tucked under and behind the external display 4a, as shown in FIG. 3, would be within the general scope of this invention.

Figure 9:
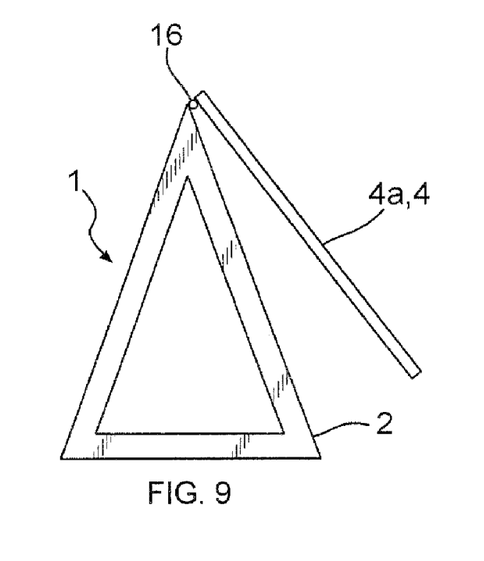
FIG. 9 is a side view of the hinged peripheral flat screen display mounting frames, mounted on the base members.
Figure 10:
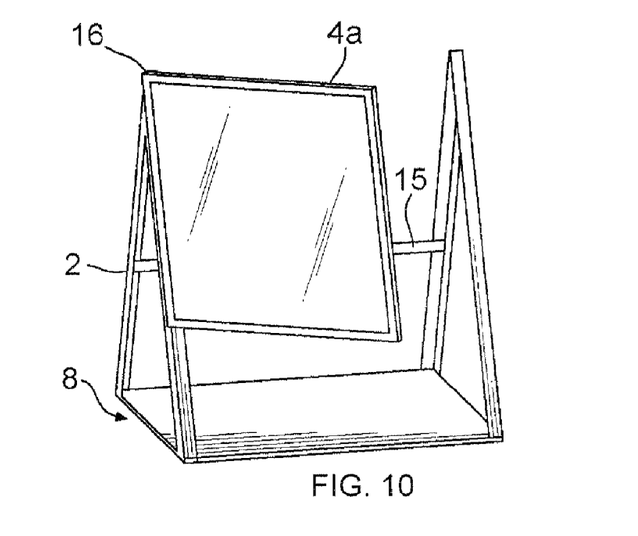
FIG. 10 is a perspective view of the stand with the flat screen-mounting frame and display hingedly attached to one of the base side members.

Other versions of the flat screen stand do not require a flat screen-mounting frame at all. The base side members may be designed to attach directly to the flat screen display as shown in FIGS. 9–11. The side members 2 and/or side member attachment means may be integrated into the display casing by the original equipment manufacture (OEM) or After Market Manufacturers (AMMs). The OEM and/or AAM versions would enable the display manufacturers to ship the flat screen displays using the smallest possible "cube space" by eliminating the need for a flat screen-mounting frame. The base side members may be designed in compliance with the Video Electronics Standards Association's (VESA) flat screen display mounting standards. This is accomplished by fabricating the mounting means for the base members directly into the flat screen display device (for vertical or horizontal mounting). Therefore, the base side members can be used with a variety of flat screen displays from different manufacturers. This version eliminates the need for a separate mounting frame, which simplifies the design and makes the device easier to package and ship, which results in reduced costs.

Other ergonomic features may be incorporated into the design of the flat screen display. As shown in FIGS. 9 thru 13, these features allow the flat screen display to be height and/or tilt-angle adjustable. Height and/or tilt-angle adjustability may be accomplished using a variety of means which are well known in the art, such as slideable attachment, mating dovetail design, hinges, hooks, clamps, etc. The adjustability of the frame allows the user to more comfortably view the display device.

Height adjustment may also be accomplished by a means for slidable adjustment of the frame 4 or display 4a along the base members 2. FIG. 3, shows attachment means or stops 6, which attach the flat screen mounting frame 4 or flat screen display 4a to base side members 2, allowing the screen to be positioned at an appropriate height to allow the bottom edge of flat screen display 4a to be positioned close to the rear edge of the laptop's keyboard. Multiple stops 6, in the form of protrusions, notches, screws, etc. may be fabricated into the mounting means on the base members 2 and/or the flat screen-mounting frame 4 or the mounting means on the back of the flat screen display 4a. The "bumps" and "notches" create friction or pressure points within the flat screen 4a or mounting frame's 4 attachment grooves for engagement with points on the base members, allowing the display to be held at a specific height. Alternatively, the screws 6 on the rear of the mounting frame 4 or the flat screen display 4a align with screw holes on the base members 2, allowing the display to be positioned at a specific height. Of course, various other means of setting the height of the display along the base members 2, may serve the function of stops 6 as well.

In another embodiment, the flat screen display 4a is tilt adjustable. Several means may be used to accomplish tilt adjustment of the display 4a. As shown in FIG. 12, the flat screen-mounting frame 4 is attached to the base members 2 using a pivot mechanisms 4c and 4d. These pivot mechanisms 4c, 4d allow the viewing angle of the flat screen display 4a to be tilt adjustable.

A means of tilt adjustment where base side members 2 are comprised of a multi-piece design is also shown in FIG. 11. The multi-piece base side members 2 include vertical legs 2c which are hingedly attached to one another while resting in a horizontal rack 2d. The horizontal rack 2d has slots 2e where the bottom ends of the vertical legs 2c rest. The tilt angle varies as the vertical legs 2c are moved horizontally along the rack 2d, relative to each other. Tilt adjustment of the peripheral flat screen display stand may also be accomplished by using elevator-adjusting legs 12, as shown in FIGS. 12 and 13. In FIG. 13, the adjustment legs 12 are mounted to the front edges of each base member 2. The elevator adjustment legs 12 tilt the mounting frame 4 (and thus the display 4a) up and back relative to the back edge of the base side members 2. There are also numerous other means for providing tilt adjustment of the flat screen display mounted on the base members.

Other variations of the portable flat screen display stand allow the laptop computer display to be quickly positioned behind the peripheral flat screen display (FIGS. 3, 9 and 10). As shown in FIG. 9, the flat screen display stand 1 has hinges 16 attached between the top of each base member and each upper corner of the flat screen display mounting frame 4 or the flat screen display device 4a, allowing the mounted peripheral flat screen display 4a (and/or frame 4) to swing up, vertically, creating an opening for the attached portable computer display 10 to be quickly positioned behind it. The version shown in FIG. 10 has the mounting frame 4 or flat screen display 4a hingedly attached to one of the base side members 2. A base plate 8 is fixedly attached along the bottom between base side members 2 for added stability. This arrangement allows the mounted display to swing open horizontally, so that the attached portable computer display can be quickly placed behind it. These configurations may also require one or more support braces 15 between the base members 2 for stability.

Figure 15:
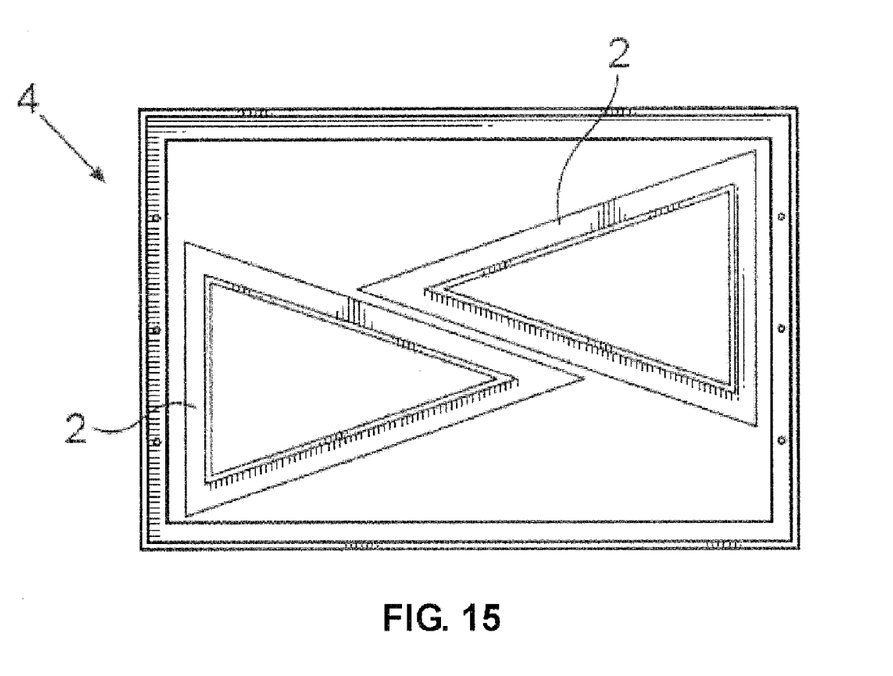
FIG. 15 is a top view of the disassembled flat screen display stand, configured for shipping with base side members laying on their sides and within the open center space of the flat screen mounting frame.

Any of the previous versions of the flat screen display stand 1 mentioned above may be designed such that they can be disassembled, collapse and/or fold flat (FIG. 15). The version shown in FIG. 1 could be disassembled so that the mounting frame 4 can be laid flat such that, the base side members 2 lie flat within the mounting frame 4, as shown in FIG. 15. The ability of the stand to fold flat allows it to be packaged with a flat screen display without substantially increasing the dimensions of the shipping container. This feature helps to lower the shipping costs of the device by reducing its "cube" space within the shipping container.

The flat screen display stand 1 configurations discussed above may also include features to allow a portable computer to quickly convert to a desktop workstation. For example, a portable computer docking station 14 (FIG. 13) may be fixed or removably attached to the stand to allow peripheral devices, including the flat screen display 4a to be instantly connected to the portable computer once the computer is placed on the dock. In one embodiment, the docking station 14 is fabricated as a part of the flat screen display stand 1. In another embodiment, the flat screen display stand 1 includes a USB, Firewire (IEEE 1394) or a combination hub that connects to a computer, allowing it to instantly connect to other peripheral devices. In yet another embodiment (FIG. 14) the flat screen display stand 1 includes mounting means for other peripheral devices 14a such as external speakers, lighting devices, microphones, videoconferencing web cameras, printers 14b, scanners, etc. reducing the overall foot print of the computer work station.

In still another embodiment of the invention, the flat screen display stand 1 could be used for other flat screen displays devices including plasma and LCD televisions (TV) 7 as seen in FIGS. 5 and 13. In most cases a flat screen TV 7 can be used in place of the peripheral flat screen display 4a. Mounting these larger TV displays 7 on the display stand 1 would allow these devices to be moveably positioned, rather than permanently affixed to a wall. Appropriately sized base members 2, mounting frames 4 and support braces 15 could be used to accommodate larger screen sizes. In a preferred embodiment, the flat screen TV 7 is manufactured with mounting means 3 built into its casing. The base members 2 would be designed to engage the mounting means built into the TVs 7. The TV's 7 or flat screen display's 4a built in mounting means and the flat screen display stand mounting means may be manufactured to be compliant with the Video Electronics Standards Association's (VESA) flat display mounting interface standards. The built in mounting means along the TV screen's casing could feature stops 6 or other adjustment means, which would allow the base members 2 to lock into place at a predetermined position. The flat screen TV 7 may also be connected to the base members 2 using a flat screen-mounting frame 4 as mentioned above. The means for mounting the flat base members 2, flat screen display 4a and/or the mounting frame 4a may include a variety of mounting means as commonly known in the art and mentioned previously.

Figure 16:
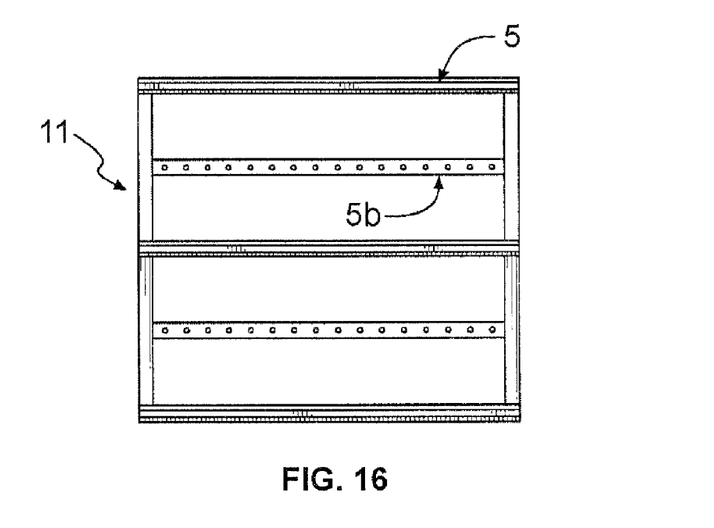
FIG. 16 is a perspective view of a vertical/wall mounting means for a flat screen display device.
Figure 17:
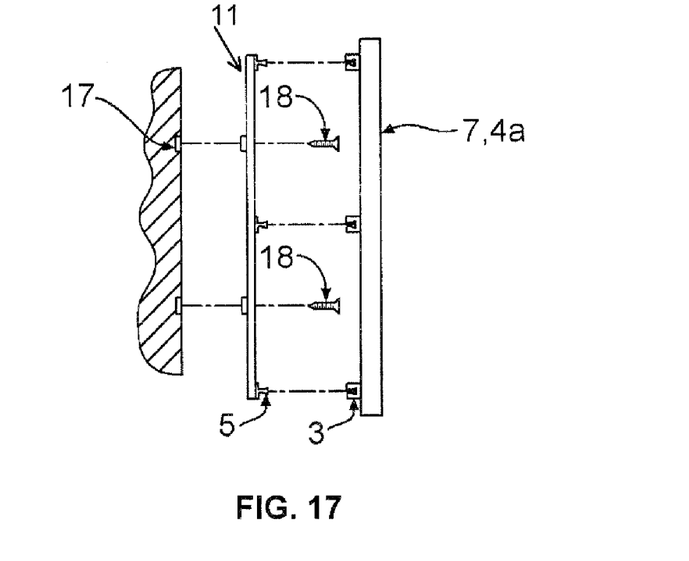
FIG. 17 is a side view of a vertical/wall mounting means for a flat screen display device.

In yet another embodiment, the flat screen display devices 4a or 7 could be mounted on a vertical flat surface such as a wall when the base members 2 are not used (FIGS. 5, 16 and 17). In one embodiment, a means for vertical mounting 3 is fabricated into the back or side of a flat screen display device's casing 4a, 7. Corresponding, appropriately sized mounting devices 5, 11 are attached to the wall studs 17 with mounting screws 18 as shown by illustration only in FIGS. 16 and 17. While the mounting means are shown positioned horizontally on the casing of the display devices 4a, 7 and the mounting rack 11, they could also be positioned vertically. The flat screen display 4a, 7 can then be slidably positioned on the wall using these means for mounting 5, 11. Alternatively, the flat screen display 4a, 7 may be mounted in a flat screen-mounting frame 4. The flat screen-mounting frame 4, containing the flat screen display 4a, 7 and means for vertical-mounting 3 could be slidably positioned on the wall mounting devices 5, 11. This wall mounting design allows a flat screen display to be easily removed from the wall for maintenance and other adjustments.

While the preferred embodiment of the invention has been described above, it will be recognized and understood that various modifications may be made therein and the appended claims are intended to cover all such modifications that may fall within the spirit and scope of the invention.

What is claimed is:
1. A stand for a flat screen display comprising:
a flat screen display positioned against a surface of the stand
at least two spaced apart base side members for positioning the flat screen display against the surface, wherein each base side member has at least one substantially vertical and horizontal portion;
a mounting frame for mounting the base side members to the flat screen display so as to create clearance behind the mounted flat screen display, wherein the mounting frame is attached to an area of the substantially vertical portion of each base side member;

an opening defined between the base side members, a bottom edge of the flat screen display and/or the surface;

said opening being designed to receive a portable computer having a display and keyboard, whereby the portable computer display is placed through the opening and positioned behind the mounted flat screen display, whereby the portable computer keyboard is positioned below and in front of the flat screen display.

2. The stand according to claim 1, wherein the mounting frame has a shape, the shape being rectangular, square, flat or polygonal.

3. The stand according to claim 1, wherein the mounting frame is comprised of a rail for retaining an edge of the flat screen display in place against the base side members.

4. The stand according to claim 1, further comprising a means for attaching the flat screen display to the mounting frame wherein the means for attaching the flat screen display to the mounting frame includes a mating dovetail system, double sided tape, hook and loop fastener, clips, or screws.

5. The stand according to claim 1, wherein the mounting frame is both height and/or angular adjustable relative to the base side members.

6. The stand according to claim 5, wherein the height adjustment of base side members is height adjustable by attaching elevator adjustment legs to the base side members.

7. The stand according to claim 5, wherein the flat screen display is angularly adjustable relative to the base side members.

8. The stand according to claim 1, wherein the stand is comprised of at least one of metal, polymer, or wood.

9. The stand according to claim 1, wherein one or more support braces are attached to and between the base side members.

10. The stand according to claim 1, wherein the mounting frame is hingedly attached to a top portion of the base side members.

11. The stand according to claim 1, wherein the mounting frame is hingedly attached to the vertical portion of one of the base sides members.

12. The stand according to claim 1, further comprising a means for attaching external peripherals including printers, speakers, microphones, web cameras, USB and IEEE 1394 hubs, or a docking station.

13. The stand according to claim 1, wherein the stand has a first position and second position, in said first position the stand is flat for packaging and shipping and in said second position the stand holds the flat screen display device.

14. The stand according to claim 1, wherein the mounting frame is removably attached to an area of the substantially vertical portion of each base side.

15. A method for adapting an external flat screen display for use with a portable computer that has a display and a keyboard, the method comprising:

providing a flat screen display stand having at least two spaced apart base side members for positioning the external flat screen display against a surface, wherein each base side member has at least one substantially vertical and horizontal portion; attaching the external flat screen display to the side base members;

providing a mounting frame for mounting the base side members to the flat screen display, wherein the mounting frame is attached to an area of the substantially vertical portion of each base side member;

providing clearance behind the flat screen display where the portable computer display can be stored;

placing the portable computer display through an open space created between the base side members and a lower edge of the external flat screen display; and placing the portable computer display under and/or behind the external flat screen display, whereby the portable computer keyboard is positioned directly in front of the external flat screen display device.

16. The method according to claim 15, comprising attaching the mounted flat screen display to the base side members using a mating dovetail system, double sided tape, hook and loop fastener, clips, or screws.

17. The method according to claim 15, comprising attaching a flat screen display to the base side members that is height and/or angular adjusted relative to the base side members.

18. The method according to claim 15, providing base side members that have multiple components that are angularly adjustable relative to each other whereby adjustment of the components of the base side members adjusts the tilt angle of the flat screen display.

19. The method according to claim 15, wherein the mounting frame is removably attached to an area of the substantially vertical portion of each base side.

* * * * *